Figure 1:
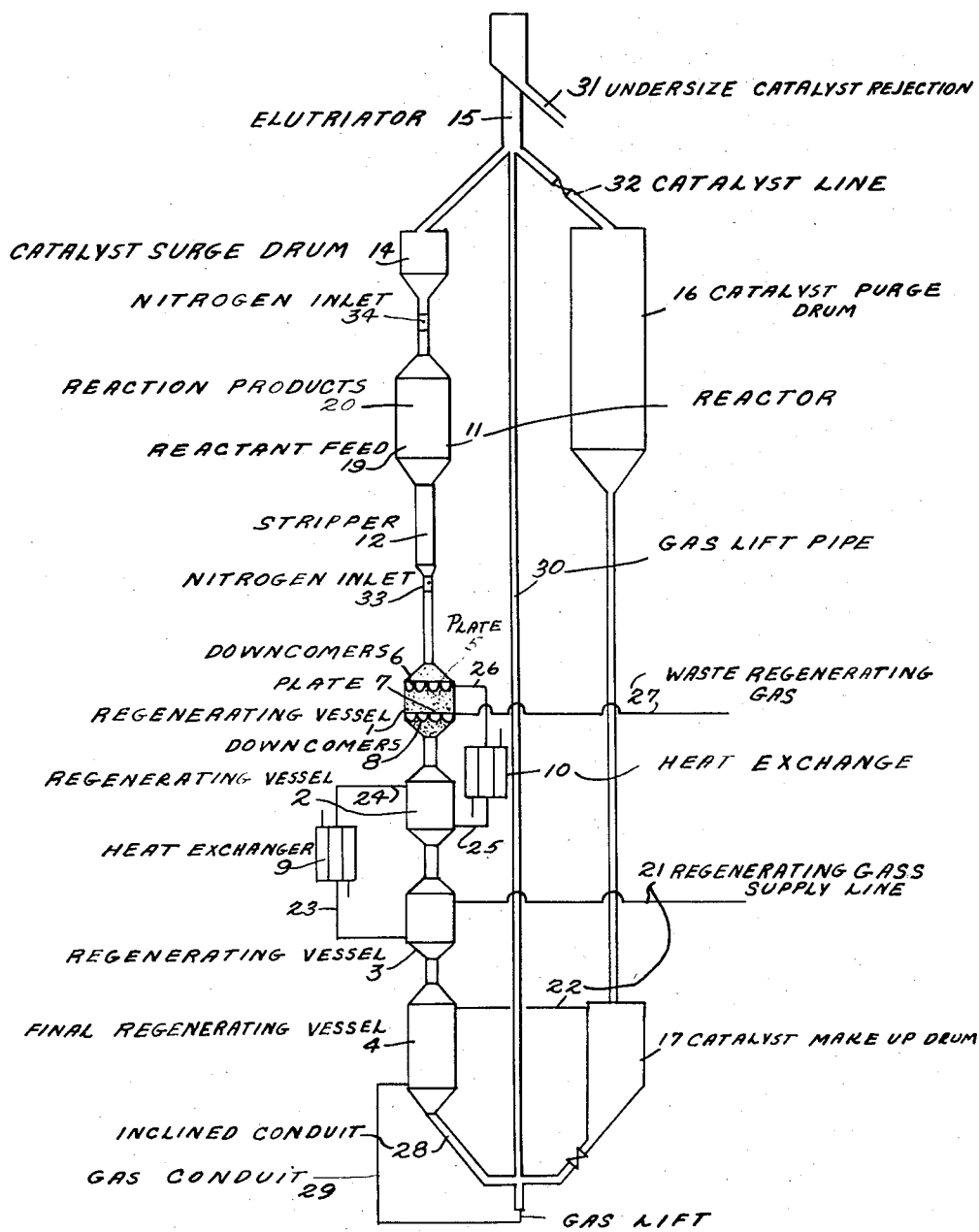

United States Patent Office 2,949,346
Patented Aug. 16, 1960

2,949,346

APPARATUS FOR CATALYST REGENERATION

Reginald Edwin Goddard, Norton-on-Tees, England, assignor to Imperial Chemical Industries Limited, London, England, a corporation of Great Britain Original application June 12, 1953, Ser. No. 361,327, now Patent No. 2,897,157, dated July 28, 1959. Divided and this application Sept. 13, 1957, Ser. No. 683,860

Claims priority, application Great Britain July 12, 1952

1 Claim. (Cl. 23—288)

This application is a divisional application of application Serial Number 361,327, filed in the United States Patent Office on June 12, 1953, now Patent No. 2,897,157.

This invention relates to processes for the production of hydrocarbons by catalytic conversion and especially to such processes conducted in the vapour phase.

It is known in hydrocarbon conversion processes using, for example; silica/alumina, or silica and/or alumina in combination with other oxides; and other metal oxide catalysts, to employ the catalyst in the form of granules and to pass hydrocarbons together with a moving body of catalyst granules through a reactor, which is maintained under appropriate conditions of temperature and pressure. The catalyst in a short time becomes coated with carbonaceous deposits resulting, e.g., from polymerisation and requires to be regenerated, which is commonly done by treatment with an oxidising gas outside the reactor.

In one form of this process the catalyst granules move through the reactor under the effect of gravity and the present invention, while of wide application, is of especial value in relation to this process.

According to the present invention granular catalyst coated with carbonaceous material flows preferably under gravity to a zone in which it is treated with an inert gas to free it from reactants and thereafter to a series of regeneration stages in each of which it is brought into contact in co-current flow with an oxidising gas of such a composition, in such proportion and at such a temperature, that the amount of carbonaceous material burnt off and the temperature in each stage is controlled within predetermined limits. The particular benefits of the invention are maintenance of high catalytic activity and good heat conversion. There are also the attendant advantages of: consistency in the composition of the product; smooth operation over long periods resulting in improved output; and savings in equipment.

Preferably there are in each stage gas distributing and gas disengaging devices comprising a series of parallel conduits situated at the top and bottom of the vessel in which the stage is conducted. Preferably, also, each of these vessels is cylindrical with top and bottom conical portions, and the gas distributing and disengaging devices are located in horizontal partitions situated at the top and bottom of the cylindrical portion of the regeneration vessel.

One especially important application of the process of the invention is to xylene isomerisation and the invention will now be described with respect to that process, although it is to be understood that it is suitable for use in the regeneration of catalysts in a wide variety of chemical processes. For isomerisation to para-xylene suitable feed materials are, for example, xylene or xylene mixtures comprising material having the following range of composition (the sum of ethyl benzene and non-aromatics lying within 4 to 40% of the whole):

| | Percent by weight |
|---|---|
| Para-xylene | 0.1 to 15 |
| Meta- and ortho-xylene | 45 to 80 |
| Ethylbenzene | 3 to 35 |
| Non-aromatics | 1 to 5 |

In a process of this type the maximum amount of carbonaceous material (calculated as equivalent carbon) that can be tolerated if good activity of the catalyst is to be maintained is about 2%, and if high activity is to be maintained about 1.0% by weight of the catalyst granules. In a typical processs the total weight of carbon to be removed during regeneration is of the order of 15 kilograms per hour, which is equivalent to 120 tonne calories per hour when the carbonaceous material is burnt. In this case it is preferred to operate in 4 stages of regeneration, (i) because greater flexibility of temperature control is achieved, and (ii) because the heat developed can be usefully and efficiently used, for example, for preheating the main reactants, or the oxidising gases used for regeneration of the catalyst.

Each of the four regenerating vessels is provided at the upper end with a gas distributing device comprising a short section fitted with a number of downcomers for the catalyst beads, and at the lower end of its cylindrical portion with a similar gas/solid disengagement section. Warm oxidising medium is fed through a pipe to the gas distribution section of each vessel, and the medium used in that vessel is taken off at the disengagement section thereof. The granules and oxidising medium, therefore, flow co-currently in each vessel, which arrangement has the advantages that the oxidising medium is at its lowest temperature where it meets the catalyst most heavily loaded with carbon, and the catalyst and oxidising medium leave each vessel at maximum temperature, thus absorbing the maximum heat of reaction.

The preheated oxidising medium is fed to the arrangement in two streams, one for the top three vessels being introduced to the gas distribution device of the third vessel, and the second to the gas distribution device of the fourth vessel.

The first stream containing 21% oxygen enters the top of the third vessel at about 400° C. and reduces the carbon content of the beads therein from about 0.2% to about 0.05% by weight. After disengagement from the beads at the bottom of the third vessel the regenerating medium passes via a cooling element, for example a finned conduit but preferably a heat exchanger, in order to reduce its temperature, to the top of the second vessel, which it enters with an oxygen content of 20.3% and at about 350° C. In this second vessel the carbon content of the beads is reduced from about 0.4% to 0.2% by weight. The regenerative medium after disengagement from the beads at the bottom of the second vessel passes via a heat exchanger, in which it is cooled, to the top of the first vessel, which it enters with an oxygen content of about 18.3% and at about 350° C. In this first vessel it is brought to about 550° C. and the carbon content of the beads is there reduced from about 1% to about 0.4%.

The second stream comprising air is fed to the top of the fourth vessel at 450° to 500° C., and is there brought into contact with the descending stream of beads containing about 0.05% carbon and at about 550° C. In this vessel the beads are substantially freed from carbon and leave it in suitable condition for return to the isomerisation reactor feed hopper, to which they are transported as an entrained stream by a gas lift employing, for example, the disengaged gas emerging from the fourth vessel.

In order to prevent leakage of air or oxidising gas into the reaction zone there are two nitrogen inlets; the first between the catalyst surge drum and the reaction vessel; and the second between the reaction zone and the first regenerating vessel, preferably at the bottom of the hydrocarbon stripping zone. The second nitrogen stream, which is of larger volume is employed as the agent for removing hydrocarbon and more volatile tars from the granules in the stripping zone.

Preferably in the isomerisation reaction zone the flow of catalyst granules and reactant is countercurrent to one another, since, in this way, the largely converted material is brought into contact with the freshly regenerated, and therefore most active, catalyst. As a further feature of the invention, therefore, the novel regenerating process is employed in combination with a reaction zone in which the flow of catalyst granules and reactants is countercurrent.

The catalyst of the present invention may be in the form of granules prepared by various methods such as grinding and grading suitable composites, which may be synthetic or of natural origin; or by pelleting under pressure such composites. A very suitable form of granules is the so-called beads. Whatever the form of granule it is desirable that it should be as robust and resistant to attrition as possible. A suitable size of granule is 1/16" to 1/4", preferably 1/8" to 3/16".

Figure 2:
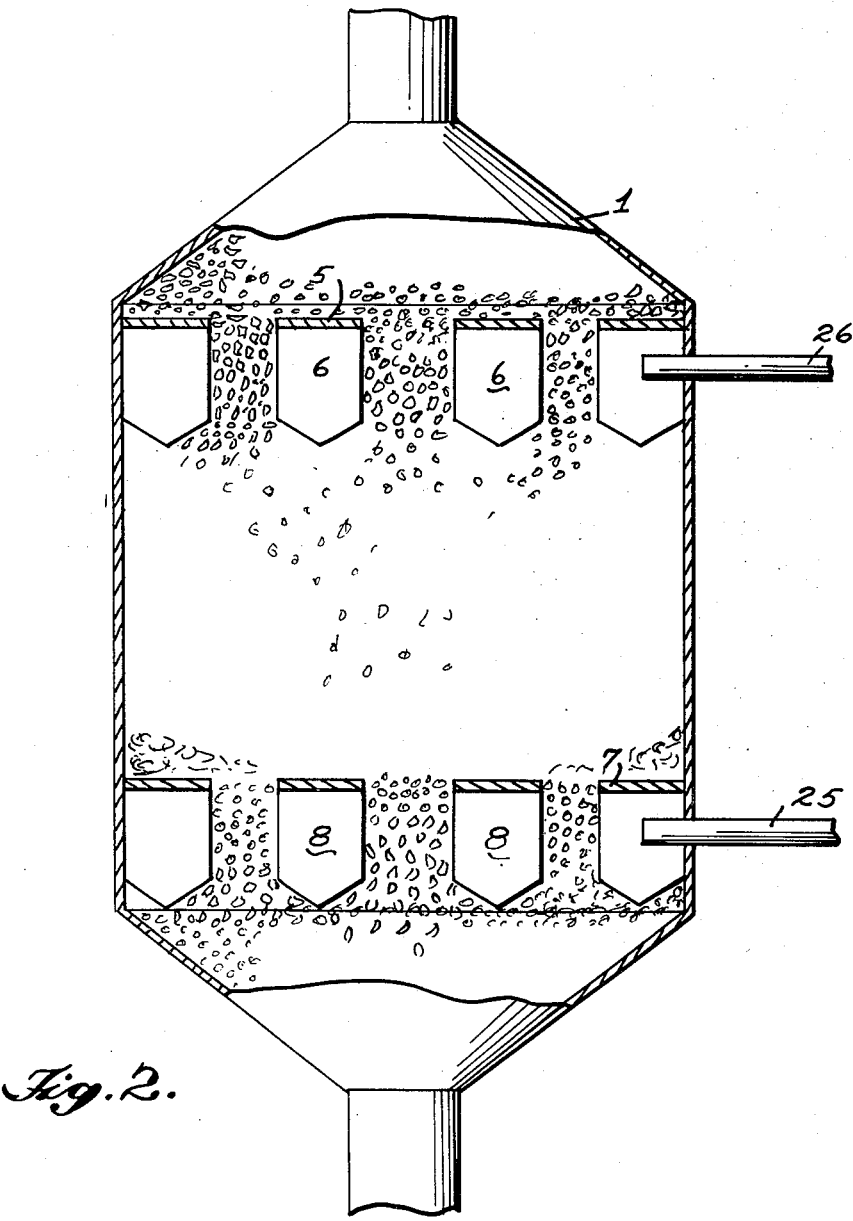

A suitable arrangement for conducting the invention is shown in the accompanying drawings, which are schematic. Figure 1 illustrates the entire apparatus, and Figure 2 is an enlarged illustration partly in cross-section of the regenerating vessels, which are substantially identical. Elements 1, 2 and 3 represent three regenerating vessels, each provided at the top with a gas distributing device comprising a plate 5 and a number of short pendant downcomers 6, and a similar gas disengagement device comprising plate 7 and downcomers 8; 4 a larger regenerating vessel similarly provided with gas distributing and separating devices; 9 and 10 heat exchangers; 11 an isomerisation reactor fitted with gas distributing and disengaging devices and with an extension 12 for stripping adsorbed hydrocarbons and more volatile tars from the granules by means of nitrogen introduced by line 33; 14 is a catalyst surge drum; 15 an elutriator; 16 a catalyst discard drum; 17 a catalyst make-up drum; 18 a gas lift to be hereinafter described; and 34 a second nitrogen inlet.

Operation is as follows. The hydrocarbon mixture comprising, for example, xylene vapours at a temperature of about 450° C. is introduced through line 19 to the isomerisation reactor in which it is brought into contact in countercurrent flow with granular isomerisation catalyst, for example, alumina/silica gel, descending under gravity from the catalyst surge drum 14. The isomerisation product is removed through line 20 and is after condensation treated in known manner for extraction of paraxylene, and if desired for removal, for example, by distillation of other components, the residue together with fresh feed being vaporised, preheated and recycled to the reactor through line 19.

The catalyst granules move continuously from reactor 11 through the cylindrical chamber 12 in which they are stripped of adhering hydrocarbons and volatile tar by means of inert gas introduced at the base through line 33, and pass to the first section 1 of the regenerating system. The oxidising gas for the regenerative system is fed in two streams, that for the regenerators 1, 2 and 3, being fed through line 21, and that for regenerator 4 through line 22.

The gas stream entering through 21 contains 21% of oxygen, is at about 400° C., flows co-currently with the granules, and reduces the carbon content of the granules entering 3 from about 0.2% to about 0.05% by weight. The gas is disengaged from the granules at the bottom of 3 and passes by line 23 through heat exchanger 9, in which it is cooled to the desired degree indirectly, either by the reaction products or by fresh regenerating gas; while the granules fall by gravity into the fourth vessel 4.

The cooled gas from 9 passes through vessels 2 and 1 in turn also in co-current flow, is heat exchanged in 10 and leaves the system by line 27. The oxygen content of the gas entering 2 by line 24 is about 20.3% and its temperature about 350° C.: the carbon content of the granules in 2 is reduced from about 0.4 to 0.2% by weight.

The regenerating gas from 10 enters the first regenerator 1 by line 26 with an oxygen content of about 18.3% and at about 350° C., and the carbon content of the granules is reduced from 1% to about 0.4% therein. The gas leaving vessel 1 by line 27 is at about 550° C. and may be passed through an exchanger for recovery of some of its heat if desired.

The inlet temperature to each of the vessels, 1, 2, 3 and 4, is controlled so that the exit temperature in each case is approximately 550° C. It is desirable not to heat the catalyst above 550° C. because its activity would thereby be decreased. It is found that a gas inlet temperature of about 350° C. is suitable for regenerators 1 and 2.

The second stream of regenerating gas enters vessel 4 at about 450° C. to 500° C. and travels therethrough co-currently with the descending stream of granules which at their entry contain about 0.05% carbon and are at about 550° C. Substantially all of the carbon is thus burnt off and the granules fall by gravity through pipe 28 to the gas lift 18 which is supplied with spent regenerating gas through line 29. From 18 the carbon free granules are elevated as a suspended stream at high velocity, for example, about 50 feet/sec. through pipe 30 into the elutriator 15. The granules are passed to surge drum 14 prior to re-use in the reactor 11, or, if a purge of catalyst, on account of reduced activity, is required, to vessel 16 by line 32. Material that has become reduced in size by attrition is rejected through line 31. Fresh catalyst granules are introduced by way of catalyst make-up drum 17.

As a further feature the invention comprises apparatus adapted for catalytic chemical reactions in which is used a granular catalyst moving countercurrently to the reactants through the reaction zone under the action of gravity which catalyst is continuously regenerated in co-current flow with regenerating gas, comprising in vertical descending series a cylindrical catalyst drum provided with a conical bottom; a cylindrical reactor provided with conical top and bottom portions and provided adjacent to the top and bottom of the cylindrical portion with gas distributing and gas disengaging devices respectively comprising horizontal plates with pendant downcomers; a tubular stripping zone; at least 3 regenerating units of similar design to the reactor, the gas inlet therefor being in the distributing zone of the bottom one, and there being pipes in which cooling elements are located connecting the gas disengaging zone of each to the gas distributing zone of that above such that in these vessels the same regenerating gas is used serially; a bottom regenerating unit of similar design to the others provided with a separate gas inlet to its gas distributing zone and a separate gas take off line at its gas disengaging zone; a line feeding from said bottom regenerating unit to a vertical gas lift pipe for elevating the catalyst granules to an elutriator situated on a higher level than the catalyst reservoir; a pipe for removing reject undersize granules from the elutriator; and vertical pipes connecting each of the vertical serial units for flow of the granules through each of them in turn. Preferably there are provided inlet pipes for an inert gas such as nitrogen under a pressure slightly above that in the reactor; the first between the catalyst drum and the reactor, the second between the reactor and the first regenerator at the bottom of the said stripping zone.

I claim:

In an apparatus for effecting the regeneration of a body of carbonaceous material coated catalyst by a co-current stream of oxygen-containing gas, which comprises in combination with a cylindrical stripping vessel: at least three separate regenerating vessels successively disposed vertically below said stripping vessel, short vertical conduit means interconnecting said stripping vessel to the uppermost of said regenerating vessels, for permitting said catalyst to flow downwardly from said stripping vessel into the uppermost regenerating vessel, each of said regenerating vessels comprising a substantially cylindrical central body and substantially conical top and bottom portions, short vertical conduit means, arranged to interconnect the bottom conical portion of each upper regenerating vessel and the top conical portion of the adjacent lower regenerating vessel, to permit downward catalyst flow through said regenerating vessels, entry plate means including a plurality of pendant downcomers, said plate being disposed within and adjacent the top of each of said cylindrical bodies, said entry plate means permitting said catalyst to enter downwardly under gravity into each of said cylindrical bodies, gas inlet means, for introducing said oxygen-containing gas stream into said cylindrical bodies immediately below said entry plate means and above the lower end of said pendant downcomers, egress plate means including a plurality of pendant downcomer egress means, said egress plate being disposed within and adjacent the bottom of each of said cylindrical bodies, said egress plate means permitting said catalyst to egress downwardly under gravity from said cylindrical bodies, gas exit means, for removing said oxygen-containing gas stream from said cylindrical bodies immediately below said egress plate means and above the lower end of said pendant downcomers, supply gas conduit means connected to said gas inlet means of the lowermost of said regenerating vessels, gas conduit means arranged externally of said regenerating vessels connecting said gas exit means of each lower regenerating vessel to said gas inlet means for each next higher regenerating vessel to permit external upward flow of said gas stream between adjacent regenerating vessels, a heat exchanger disposed on said gas conduit means for controlling the temperature of said gas stream, and exit gas conduit means connected to said gas exit means of the uppermost regenerating vessel for removing said gas stream from said apparatus.

References Cited in the file of this patent

UNITED STATES PATENTS

| | | |
|---|---|---|
| 2,409,353 | Guiliani | Oct. 15, 1946 |
| 2,414,373 | Gerhold | Jan. 14, 1947 |
| 2,457,837 | Simpson | Jan. 4, 1949 |
| 2,550,727 | Shimp | May 1, 1951 |
| 2,684,927 | Bergstrom | July 27, 1952 |
| 2,809,922 | Berg | Oct. 15, 1957 |